United States Patent Office 3,140,673
Patented July 14, 1964

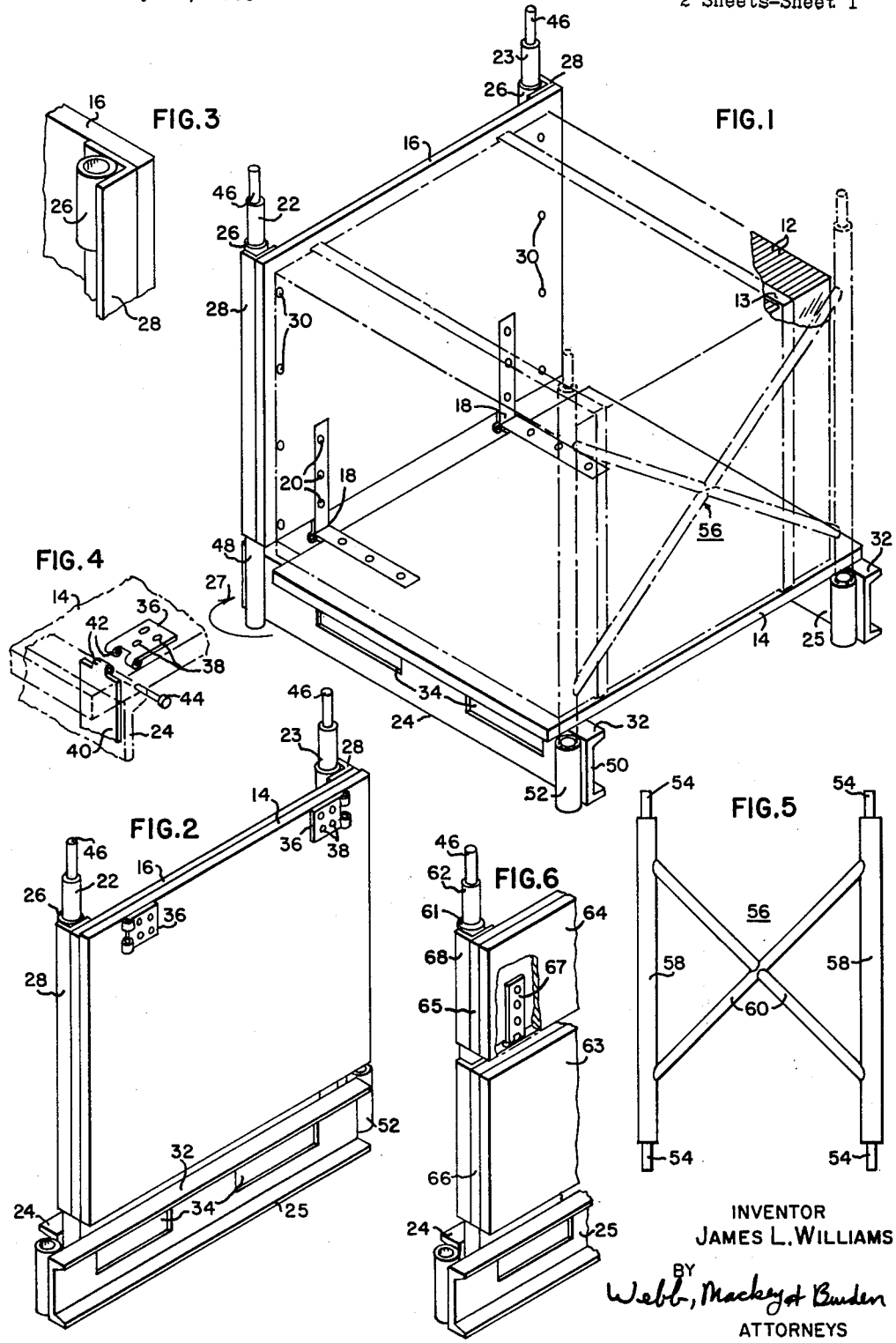

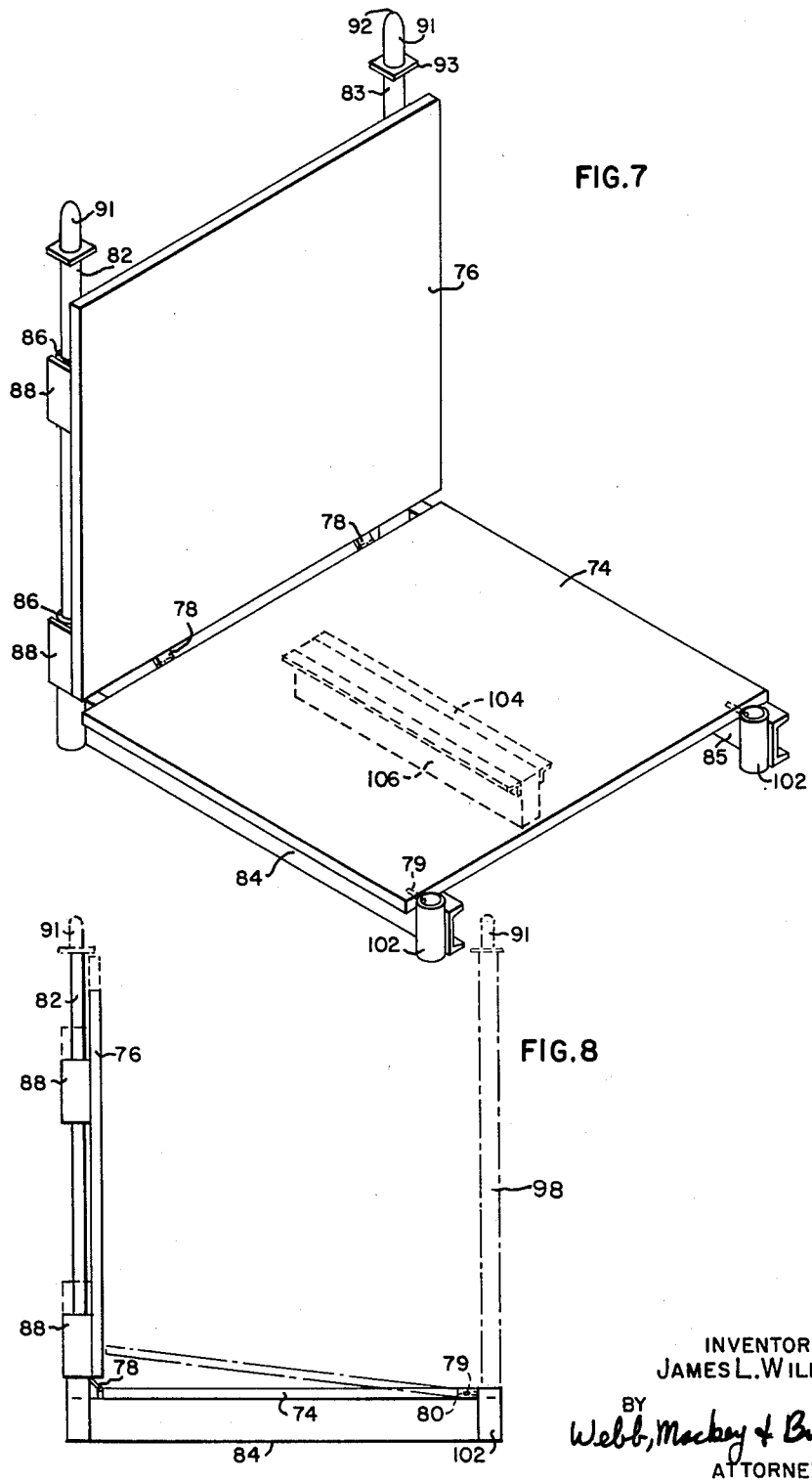

3,140,673
GLASS BUCK
James L. Williams, Kingsport, Tenn., assignor to American-Saint Gobain Corporation, Kingsport, Tenn., a corporation of Delaware
Filed May 14, 1963, Ser. No. 280,363
11 Claims. (Cl. 108—53)

This invention relates to improvements in material handling and relates in particular to a new and novel pallet or buck, on which materials such as plate glass may be conveyed and stored.

Dock boards, pallets or bucks generally are rectangular platforms on which material such as flat glass (sheet, plate or patterned) may be conveyed or stored. Such platforms are generally provided with receptacles that receive the prongs of forklift trucks which elevate the pallets or bucks to transfer the materials positioned on them.

Where it is desirable to store such materials, as in a warehouse, they are generally stored on the pallets or bucks, since they will eventually have to be moved again. Such loaded pallets or bucks seldom may be seated on top of one another without damaging the materials being stored, and consequently, much warehouse space is wasted unless some provision is made to permit vertical stacking or positioning of the pallets or dock boards.

One such method designed to permit the stacking of pallets or dock boards is to provide frame members that are attached to the boards and surround the materials being stored and, consequently, the dock boards are supported by such frames rather than the materials being stored. Although such frame members permit stacking and conserve on storage space, they also occupy space when not in use, so that they may be consistently in the way, or occupy valuable storage space when not in use.

A typical example of such handling and storage problem is the shipping and storage of flat glass (sheet, plate or patterned). Sheets of such glass are conventionally stacked edgewise on "glass bucks." Such glass will not support other bucks of glass so that supporting frames must be provided. However, such frames are bulky and difficult to handle and transport once the glass has been removed.

The usual buck or pallet is normally used only once since (1) they are too bulky and therefore too expensive to return, (2) they are too bulky to store empty, and (3) they are generally subject to damage and are costly to repair.

The buck or pallet of the present invention consists of two flat rectangular members that are pivotally connected to one another along adjacent edges so that they may be folded together. One of the members is supported vertically while the other is horizontally positioned when the pallet is in use. Upright frame members support the vertical member while frame members that are mounted to the base of the upright members extend beneath and support the horizontal member. The latter frame members are pivotally attached to the upright frame members in a manner that they may be pivotally or rotatably adjusted about the upright members in their horizontal plane, but not in their vertical plane. In this manner, the buck may be folded up, when not in use, by folding the horizontal member upwardly against the vertical member, and by pivoting the horizontal frame members each independently inwardly so that a relatively compact, easily stacked and stored pallet or buck is obtained.

Means are provided for securing the horizontal member or the deck board of the buck to the pivotally movable horizontal frame members. The horizontal frame members may be provided with slots to receive the arms of a forklift truck. Additionally, the bottoms of the vertical upright members are formed to receive the tops of like members so as to seat upon the tops of such like members and the tops of such vertical members are disposed to project into the bottoms of like vertical members. Additionally, the end of the horizontal frame members are provided with means to receive a vertical frame and to seat upon a like vertical frame so that these bucks may be provided with supporting frames and may be appropriately stacked.

It is, accordingly, the object of the present invention, to provide a pallet or buck upon which material may be positioned, which may be stacked without imposing any weight on the stored material, and which may be assembled and folded into a compact, flat, easily stored object.

It is also an object of the present invention to provide a pallet or buck that offers both a loading platform or deck, and a vertically positioned platform disposed to offer lateral support to materials loaded on the loading platform or deck; and, additionally, the two platforms may be folded together and the supporting legs of the loading platform folded inwardly so that a compact, easily stacked and stored object is obtained.

Other objects and advantageous features will be obvious from the following description and the drawings wherein:

FIGURE 1 is a perspective view of a pallet or folding buck that embodies the features of the present invention shown as supporting sheets of plate glass;

FIGURE 2 is a perspective view of a pallet or a folding buck of FIGURE 1 shown in a folded position;

FIGURE 3 is a fragmentary perspective view of a segment of the buck board 16 and one upright supporting member 22 showing the means by which these members are joined;

FIGURE 4 is a fragmentary perspective view of one portion of the deck board 14 and one horizontal arm 24 showing means by which these members may be attached;

FIGURE 5 is an elevation view of a frame member used in conjunction with the buck of FIGURES 1 through 4 to stack material;

FIGURE 6 is a fragmentary perspective view of an apparatus that constitutes a modification of the embodiment of FIGURES 1 through 5 in that it provides for tiers of material to be positioned on a single buck;

FIGURE 7 is a perspective view of a pallet or folding that constitutes a still further modification and improvement of the present invention, and FIGURE 8 is a side elevation view of the apparatus of FIGURE 7.

The embodiment of FIGURE 1 shows a pallet or buck upon which there is shown to be positioned in dotted outline vertically stacked sheets of glass 12 which are attached to the pallet by means of bands 13. The pallet or buck is shown to be formed of a horizontally positioned loading platform or deck board 14, and a vertically positioned back board 16. The deck board 14 is shown to be pivotally attached to the back board 16 by means of hinges 18 that are secured to the back board 16 and deck board 14 by means of screws as shown at 20.

The back board 16 is shown to be supported in its vertical position by means of upright members 22 and 23. Upright members 22 and 23 are rigidly attached at their bottom or base to horizontally positioned frame arms 24 and 25, which extend beneath and support the loading platform or deck board 14.

The upright members 22 and 23 are cylindrical in shape, and project through sleeve members 26 which are, in turn, rigidly attached (as by welding) to angle beams 28. Angle beams 28 are attached to the back of the back board 16 by means of screws such as shown at 30 which project through appropriate perforations in the angle beams 28 and into the back board. The upright members 22 are free to rotate within the sleeves 26 so that the horizontally positioned arm 24 may rotate in a horizontal plane and may be folded in a manner described hereinbelow.

As may be seen, particularly by FIGURE 2, when the pallet or buck is not in use, the loading platform or deck board 14 may be folded upwardly against the back board 16. The horizontally positioned arm 24 may be rotated around the base of upright 22 in the direction of the arrow 27, while the upright 22 revolves within the sleeves 26 so that the arm 24 will rotate through an angle of approximately 270° and fold in line with the already folded deck board 14 and back board 16. The horizontal arm 25 may be rotated inwardly 90° to fold against the arm 24. In this manner, the buck or pallet of FIGURE 1 is converted into the compactly folded member shown by FIGURE 2 which obviously is far more amenable for storage handling and economical shipment back to the supplier.

The horizontal arms 24 and 25 are shown to be formed of U-shaped beams which conveniently possess flat surfaces as at 32, upon which the deck board 14 may rest and which will seat solidly on any flat surface. There arms are also provided with horizontal slots 34 which are positioned to receive the forks of a forlift truck used to elevate and transport the pallet or buck with a load such as that shown at 12 positioned on the loading platform or deck board 14.

In the handling of materials such as shown at 12, it is desirable to rigidly attach the arms 24 and 25 to the deck board 14. To accomplish this, one section 36 of a hinge assembly is attached to the deck board (see FIGURE 4). The sections 36 of the present embodiment are attached to deck board 14 by means of screws such as shown at 38. The other section 40 of the hinge assembly is attached to the arms 24 or 25 (as by welding). The sections 36 and 40 are so positioned that when the deck board 14 is properly positioned on the arms 24 and 25, the eyes 42 of the hinge assemblies 36 and 40 mesh, so that a hinge pin such as shown at 44, may be inserted to fasten the hinge sections 36 and 40 to one another, and, consequently, secure the deck board 14 to the arms 24 or 25. Such pins 44 may be easily withdrawn so as to conveniently provide a means to rapidly and effectively attach the arms 24 and 25 to the deck board 14, or detach such arms so that the deck board and arms may be folded up and buck or pallet prepared for storage.

Upright members 22 and 23 are fabricated from tubular sections and are provided with cylindrical inserts 46 of a diameter disposed to fit inside cylindrical bores of members 22 and 23. Inserts 46 are rigidly affixed to the upright members 22 and 23 so that the bottom or base portion 48 of members 22 will slide over and seat on the top of the members 46 when the pallets or bucks are stacked one upon the other. The horizontal arms 24 and 25 extend slightly beyond the deck board 14 as shown at 50 and to such extensions there is rigidly attached (as by welding) vertically positioned sleeve members 52. Sleeve members 52 are positioned to receive inserts 54 of a supporting frame member 56 such as that shown in FIGURE 5 and illustrated in FIGURE 1 in dotted outline.

Frame member 56 is formed from two spaced tubular arms 58 and cross-support members 60. The extensions 54 are inserted into the ends of tubular members 58 in precisely the manner that inserts 46 are as fixed to uprights 22 and 23. The frame 56 is thus disposed to be seated in the sleeves 52 in the manner shown, particularly by FIGURE 1.

Hence, it may be easily observed that by use of a frame, such as frame 56, bucks may be stacked one above the other, each being supported by the uprights 22 and 23 and a frame such as frame 56.

It will be understood that the apparatus of my invention may be subjected to considerable modification without deviation from the scope of its concept. For example, the floor or deck board and the back or back board may be detached from the frame members and different width backs and floors may be employed to vary the width of the buck.

Also, the back board could be split into two or more horizontal strips, each provided with sleeves such as sleeves 26 through which the cylindrical frame members project. Each segment could then be pivotally attached to a floor or deck board so that the back would be adjustable to accommodate multiple tier stacking. An example of such a modification is shown by FIGURE 6. In this figure there is shown a portion of a regular back board 66 which is attached to the upright frame member 62 by means of sleeves (not shown) in the manner in which back board 16 is attached to the uprights 22. Positioned horizontally above back board 66 is a back board 65 attached to the upright 62 by means of sleeves 61 and angle beams 68 in the manner of the previously discussed embodiments. The back board 65 is pivotally engaged with a deck board 64 by means of hinges 67. Back board 66 is, of course, also pivotally engaged with a deck board 63.

Thus, it may be seen that by means of this embodiment material may be stacked on the floor or deck board that is pivotally engaged with back board 66 and deck board 64 may be lowered onto such sheets to accommodate a second tier of such sheets. Since the frame members (shown by the previous embodiments) absorb the weight of the stacked bucks, the sheets in the lower tier of a single buck need support only the weight of the upper tier of that buck. However, it is obvious that supporting means may be provided to the floor or deck board 64 if such means be desired.

If the glass sheets to be shipped or stored are large, the deck board 64 need merely be folded to the back board 65 in the manner shown by FIGURE 6 and the larger sheets may be accommodated in the manner of the embodiment of FIGURE 1.

In the embodiment of FIGURES 7 and 8 there is shown a buck that is similar to that of FIGURES 1 through 5, but which exhibits additional advantageous features. The buck of FIGURES 7 and 8 is provided with a deck board 74 and a back board 76 that corresponds to deck board 14 and back board 16 of the previous embodiments. Deck borad 74 and back board 76 are hinged together as shown at 78 and are supported by uprights 82 and 83 and horizontal arms 84 and 85 in the manner of the previous embodiments.

Back board 76 is rigidly attached to angle members 88 which are, in turn, rigidly attached to sleeves 86 through which cylindrically shaped uprights 82 and 83 project so that uprights 82 and 83 may rotate within the sleeves 86 and the buck may be folded in the manner shown by FIGURE 2.

In the embodiment of FIGURES 7 and 8, however, sleeves 86 are slideably engaged with uprights 82 and 83 so that the back board 76 may be vertically elevated in the manner shown in dotted outline by FIGURE 8.

A rod or pin 79 is rigidly attached to a portion of each sleeve member 102 (corresponding to sleeves 52 of the previous embodiments) which project above the arms 84 and 85 and project rearwardly. Appropriately positioned recessions 80 are provided in the end of deck board 74 that are disposed to receive the pins 79 so as to lock the arms 84 and 85 to the deck board 74.

Such arrangement as described above provides an apparatus that may be more easily unfolded and assembled or disassembled and folded than the previously described embodiments. Since the back board 76 may be elevated on the uprights 82 and 83, the deck board 74 may be appropriately retracted (see dotted outline of FIGURE 8). Accordingly, arms 84 and 85 may be unfolded and properly positioned, deck board 74 may be unfolded and retracted (by elevating the back board 76) and then extended (by lowering back board 76) so that pins 79 extend into recessions 80. The necessity of hinge assembly sections 36 and hinge pins 44 is eliminated.

To disassemble the buck after use, one need merely elevate back board 76 and fold arms 84 and 85 and deck board 74.

Additionally, in the embodiments of FIGURES 7 and 8 there is provided to the top of uprights 82 and 83 and to the top of tubular members 98 (corresponding to members 58 of FIGURE 5) stacking pins 91. Stacking pins 91 are tubular members formed with a rounded upper end 92 and a centrally positioned sleeve 93 that is rigidly attached to pins 91 so as to form a shoulder. The pins are slid into the upper ends of uprights 82 and 83 and may be rigidly attached to such members so that the shoulders formed by sleeves 93 will act as stops limiting the vertical elevation of sleeves 86 and hence back board 76. The primary purpose of stacking pins 91, however, is to provide a superior seat for the bottom of corresponding uprights 82 and 83 and sleeve members 102 during stacking.

A still further improvement is provided by angle members 104 (FIGURE 7). Angle members 104 are attached (as by screws) to the bottom of deck board 74. A supporting block 106 may optionally be positioned between the depending flanges of the angle members 104 so as to bear on the floor that supports arms 84 and 85 so as to provide additional support to deck board 74 where such additional support is deemed necessary.

The folding pallet or buck of the present invention may be fabricated from a variety of material. The uprights 22 and 23 (or 82 and 83) and horizontal arms 24 and 25 (or 84 and 85) may be conveniently fabricated from steel and rigidly attached members, such as sleeves 52, may be welded in place, or can be rigidly attached to the arms 24 and 25 by other conventional means. The deck board and back boards in the present embodiment are constructed of wood; however, it is obvious that such members may be fabricated from a wide variety of materials, including plastics and metals.

Also, the deck board and back boards are generally rectangular in shape. Obviously, such members may be elongated or square so that in the present invention the term "rectangular" encompasses and includes square members.

I claim:
1. A foldable buck comprising:
   (a) a rectangular shaped deck board;
   (b) a rectangular shaped back board pivotally attached along one edge to one edge of said deck board so that said boards are pivotally adjustable in respect to one another and may be folded together, and
   (c) frame members consisting of two L-shaped members, one leg of each said L-shaped members being rotatably attached to said back board so that the other legs of said L-shaped members are disposed to rotate about said one leg in a common plane, said one legs of each said L-shaped members being disposed to support said back board vertically when said other legs are positioned to support said one legs vertically so that said deck board may be pivotally positioned horizontally above said common plane and said other legs are disposed to support said deck board when positioned thereunder.

2. A foldable buck as set forth in claim 1 wherein said one legs of each said L-shaped members is attached near each edge and substantially parallel thereto of the opposing parallel edges of said back board that extends 90 degrees from said one edge of said back board that is pivotally attached to said deck board.

3. A foldable buck as set forth in claim 2 wherein said deck board and said back board are hinged to one another.

4. A foldable buck as set forth in claim 2 wherein the bottoms of said one legs of said L-shaped members, where said one legs are joined with said other legs, are disposed to be received and supported by the top ends of like leg members and the free ends of said other legs are provided with means to be seated upon a supporting frame and to support a supporting frame so that said pallets may be stacked one upon the other.

5. A foldable buck as set forth in claim 1 wherein slots are provided in said other legs to receive the prongs of a forklift truck.

6. A foldable buck as in claim 5 wherein means are provided to rigidly attach said deck board to said other arms when supported thereby.

7. A foldable buck comprising:
   (a) a rectangular shaped deck board;
   (b) a rectangular shaped back board pivotally attached along one edge to one edge of said deck board so that said deck board and back board may be folded together;
   (c) frame members consisting of two L-shaped members, one leg of each being attached to one surface of said back board so that each of the other legs of said L-shaped members extend in a plane beneath said deck board when said deck board is pivotally positioned 90 degrees from said back board, each said other legs being pivotally mounted to said one legs within said plane so that said other legs may be pivotally positioned beneath said deck board to support said deck board when it is positioned 90 degrees from said back board or folded together when said deck board and back board are folded together.

8. A foldable buck comprising:
   (a) a rectangular sheet;
   (b) frame members consisting of parallel spaced upright members attached to said sheet (a) and disposed to support said sheet (a) in a substantially vertical plane;
   (c) a second rectangular sheet pivotally attached along one edge to the bottom edge of said sheet (a) so that said sheets may be folded together and said bottom sheet may be positioned in a substantially horizontal plane, and
   (d) second frame members horizontally mounted to the base of said frame members (b) and disposed for pivotal movement in a horizontal plane beneath said second sheet (c) when it is positioned in a horizontal plane so that said second frame members (d) may be positioned beneath said second sheet (c) and support said sheet or folded together when said second sheet (c) is folded to said first sheet (a).

9. A foldable buck as set forth in claim 7 wherein at least one additional rectangular sheet is mounted to said frame members (b) above said rectangular sheet (a) in a substantially common vertical plane with rectangular sheet (a), at least one additional second rectangular sheet, one each pivotally attached along one edge to the bottom edge of each said additional rectangular sheet so that said sheets may be folded together and each said bottom sheets may be positioned in a substantially horizontal plane.

10. A foldable buck comprising:
   (a) a rectangular shaped deck board;
   (b) a rectangular shaped back board pivotally attached along one edge to an edge of said deck board so that said boards are pivotally adjustable in respect to one another and may be folded together;

(c) two sleeve members attached to said back board having their central axis aligned substantially 90 degrees from said one edge, and (d) frame members consisting of two L-shaped members, one leg of each said L-shaped members projecting through one of said sleeve members so that said one leg is disposed to rotate within said sleeve member and the other legs of said L-shaped members are disposed to rotate in a common plane adjacent said one edge.

11. A foldable buck as set forth in claim 10 wherein said sleeve members are disposed to slide on said one legs so that said back board may be positioned on said one legs.

References Cited in the file of this patent
UNITED STATES PATENTS

| | | |
|---|---|---|
| 2,579,685 | Loose | Dec. 25, 1951 |
| 2,683,010 | Hamerslay | July 6, 1954 |
| 2,704,194 | Diamond | Mar. 15, 1955 |
| 2,839,198 | Lefevre | June 17, 1958 |
| 2,863,566 | White et al. | Dec. 9, 1958 |